Dec. 9, 1941.                B. DE H. MILLER                2,265,302
PROCESSING AND BLENDING MATERIALS
Filed Nov. 25, 1939            2 Sheets-Sheet 2
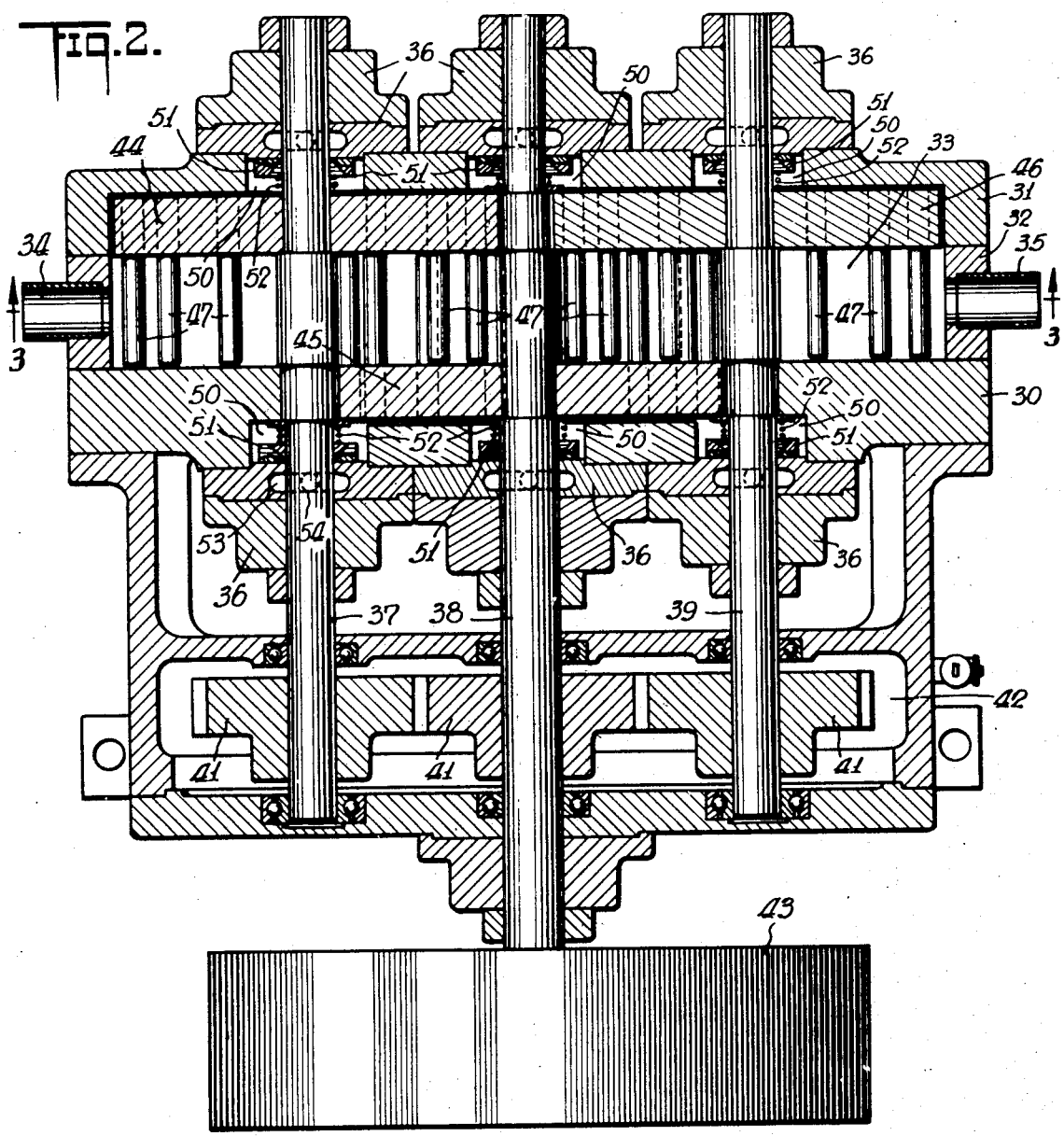
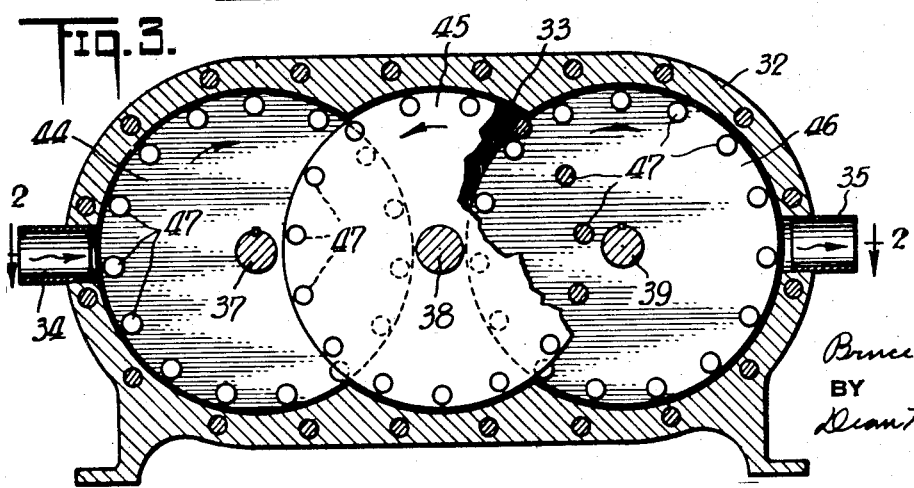
INVENTOR
Bruce De Haven Miller
BY
Dean Fairbank & Hirsch
ATTORNEYS Patented Dec. 9, 1941

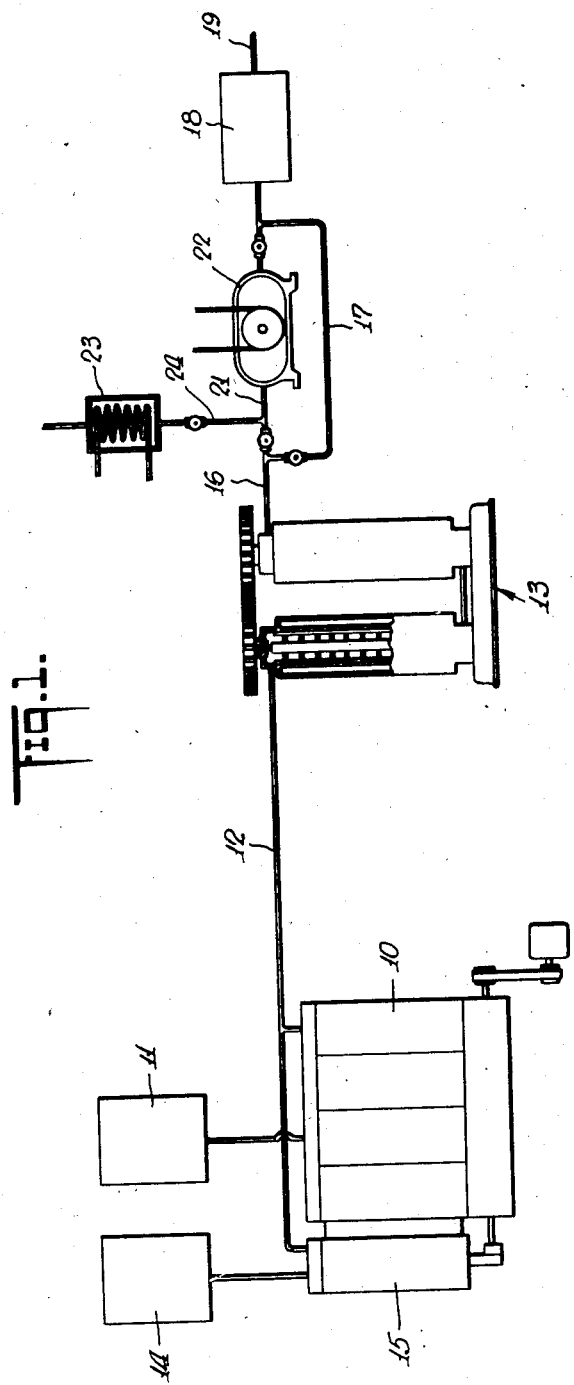

2,265,302

UNITED STATES PATENT OFFICE 2,265,302

PROCESSING AND BLENDING MATERIALS

Bruce De Haven Miller, Louisville, Ky., assignor to The Girdler Corporation, Louisville, Ky., a corporation of Delaware Application November 25, 1939, Serial No. 306,101

11 Claims. (Cl. 259—6)

This invention relates particularly to the processing of chilled materials after the addition of certain ingredients thereto, although certain features of the invention are applicable generally to the mixing and working of materials even without this addition.

The invention is applicable to many diversified uses as for example the crutching of soap, or the adding of salt or other ingredients to butter, or the adding of any ingredient to a previously treated material. To simplify the description, the invention will be described with reference to its application to the manufacture of margarine merely as an example.

In manufacturing margarine, the emulsification of oil and moisture in accordance with certain formulas results in a so-called "tight" emulsion, in which the flavor and aroma of previously added ingredients may be subdued. Therefore, in order to bring out the aroma and flavor of ingredients such as milk, salt and the like, it may be desirable to add these ingredients following the formation of the emulsion or partially before and partially after this formation, rather than adding all of such ingredients prior to the formation of the emulsion.

Furthermore, in the manufacture of margarine wherein a supercooled material in liquid form is produced, subsequently set up into solidified form and then worked, it has been found that a blending or mechanical working action of such materials is frequently desirable.

One object of the present invention is to provide new and improved apparatus and process for carrying out some or all of the foregoing steps in an efficient and controlled manner.

Another object is to provide a new and improved mechanical blender, which has an efficient blending or mixing action, which is self-lubricated by the material operated upon, which has interchangeable duplicate working parts, which is self-cleaning in operation requiring no separate or special means for scraping the deposits of material therefrom, and which is adaptable to sensitive speed regulation, and consequent sensitive controlled working of the material.

Another object is to provide new and improved margarine blending apparatus and process, which enhance the flavor and aroma of the margarine, which form a homogenized product of improved texture, which effect efficient blending or mixing of margarine without the necessity of heating means, whereby a slippery surface on the product is obviated, and which assist in the setting-up action of a supercooled liquid, so that the necessary size of the setting-up apparatus is reduced to a minimum.

Various other objects and advantages of the invention will be apparent from the following particular description, and from an inspection of the accompanying drawings, in which:

Fig. 1 shows somewhat diagrammatically an arrangement of apparatus parts, wherein the blending operations are employed in conjunction with a continuous closed pressure system for handling materials of various types, Fig. 2 is a horizontal sectional view of the blending unit, and Fig. 3 is a vertical section taken somewhat along the lines 3—3 of Fig. 2.

In the system shown in Fig. 1 for manufacturing margarine, and disclosed fully in co-pending application Serial No. 262,644, filed March 18, 1939, oil is delivered by a pump 10 from a reservoir or vessel 11 into a pressure line 12 leading to a processing apparatus 13. At the same time, oil, moisture such as milk, or other ingredients may be pumped by means of an adjustable pumping cylinder 15 from a reservoir or supply tank 14 into the pressure line 12 in any desired ratio with respect to the material delivered from the supply tank 11. The pressure applied by the pumps 10 and 15 serves to force the material being processed through the entire system, and is the high pressure point of the system, although as far as certain aspects of the invention are concerned, booster pumps could be employed at any step in the system should occasion demand.

The apparatus 13 is desirably of the general type disclosed in United States Patent No. 2,013,025, in which the material under pressure is subjected to chilling and concurrent agitation before delivery to an outlet 16 to emulsify and super-cool this material, while maintaining it in liquid form below the normal setting temperature. Obviously, other forms of apparatus in which this result can be secured may be employed without departing from the scope of this invention.

Upon passing from the apparatus 13 into the outlet 16, the material tends to set up into a hard solidified form, and unless kept in an agitated condition may require excessively high pressure to continue its flow through the system.

In case the formula of the margarine is such that all milk, salt and other similar ingredients can be added prior to the processing step in the apparatus 13, and no subsequent blending action is necessary, the material may pass from the line 16 through a valve controlled by-pass line 17 directly into a setting-up apparatus 18, which allows the super-cooled liquid to reach a substantially quiescent state, and set up into solidified form. From this setting-up apparatus 18, the solidified material may be extruded through an outlet 19 into a molding or packaging apparatus by the pressure existing in the system.

If however it is desired to subject the material emerging from the processing apparatus 13 to a further mechanical working or blending of the material, this material may be passed through a valve controlled line 21 into the mechanical blending apparatus 22, and from there into the setting-up apparatus 18, or said material may be divided with part thereof going through the blender 22 and part around said blender through the by-pass line 17 and directly into said apparatus 18. In case it is desired to add moisture or flavoring material such as milk or salt, following the processing operation in the unit 13, such materials may be precooled in a heat exchanger 23 and delivered therefrom into the line 21 through a line 24.

As shown in Figs. 2 and 3, the blending apparatus 22 comprises a pair of separate opposed housing sections 30 and 31, spaced by a peripheral casing wall 32 defining a working chamber 33 through which the material under pressure passes from an inlet 34 to an outlet 35, while being mixed, worked or blended. Journalled in suitable bearings 36 on the housing sections 30 and 31, and passing through the working chamber 33 transversely of the general direction of flow of the material in said chamber are two or more parallel shafts, three of these 37, 38 and 39 being shown for the purpose of illustration. These shafts 37, 38 and 39 may be driven at the same regulated speed in any suitable manner. For instance, they may have keyed or otherwise secured thereto similar intermeshing spur gears 41, enclosed in a suitable gear housing 42 on the outside of the working chamber 33, and one of these shafts, as for instance the shaft 38, may project outwardly beyond said housing, and carry on its projecting end a pulley 43 driven from a suitable source of power.

Keyed or otherwise affixed to the shafts 37, 38 and 39 in the working chamber 33 are circular discs or plates 44, 45 and 46 respectively, each carrying a series of agitating fingers or pins 47, equally spaced circumferentially near the periphery thereof, and extending substantially parallel to their respective shafts. The plates 44, 45 and 46 are arranged alternately in staggered opposed relationship with the two plates 44 and 46 abreast on one side of the working chamber 33, and the plate 45 centrally of the two plates 44 and 46, and in reverse relationship with respect thereto at the opposite side of said chamber, whereby the rotary paths of travel of the fingers 47 on said central plate 45 radially overlap the rotary paths of travel of the fingers 47 on the other two plates. This alternate arrangement of plates 44, 45 and 46 assists in balancing the torque load on the shafts, and results in a quiet running apparatus.

The different sets of fingers 47 of the respective plates are spaced and arranged, so that they have an interweaving action during their radial overlapping movements in the direction indicated in Fig. 3 without interfering with each other. Also the plates are so dimensioned, that the central plate 45 extends on its opposite sides close to the shafts 37 and 39, so that the fingers carried by said plate 45 travel close to said shafts. Furthermore, the plates with their respective fingers are exact duplicates, so that they may be interchanged, and the fingers of one plate extend nearly up to the inner face of the opposed plate, so that the three sets of fingers overlap longitudinally almost to their full length.

In order to seal the working chamber 33 against leakage, the bearings 36 define with the housing sections 30 and 31 and with the outer faces of the plates or discs 44, 45 and 46 chambers or housings 50 enclosing packings 51 respectively, which are pressed against said bearings 36 by springs 52 acting between said packings and said plates. These packings effectively seal the working chamber 33 against leakage along the shafts 37, 38 and 39, and hold said shafts with their respective plates and attached fingers in proper relative position with respect to each other and with respect to the housing sections 30 and 31. Any liquid escaping past the packings will be caught in annular grooves 53, and drawn off through ports 54.

In the operation of the blender 22, the material entering the working chamber 33 under pressure through the inlet 34 will first come in contact with the fingers 47 of the plate 44, and receive a stirring or blending action therefrom. As the material moves further along in the working chamber, it receives the combined mixing action of the fingers of the two plates 44 and 45, and then subsequently the combined mixing action of the fingers of the two plates 45 and 46. The fingers of the two plates 44 and 46 in passing in close proximity to the central shaft 37, and the fingers of the central plate 45 in passing in close proximity to the two outside shafts 37 and 39 cooperate with said shafts in working and stirring the material.

Due to this continuous stirring, agitating and mixing of one part of the mass of material with another, any ingredients added through the pipe 24 to the material coming from the pipe 16 will be thoroughly mixed and blended therewith by the time the material reaches the outlet 35. With those materials which have been violently agitated in the processing unit 13 and which enter the pipe 16 as a supercooled liquid, the agitation which takes place in the blender unit 22 may be less violent than that which took place in said unit 13, so that the super-cooled material will begin to solidify while passing through said blender unit. While this reduced agitation in the blender unit 22 permits partial solidification of the material therein, it prevents this material from being set up into hard solid form while in said unit. Consequently, the setting-up action, instead of taking place entirely in the unit 18, is partly carried out in the blender unit 22 under control of the easily regulated shafts 37, 38 and 39, so that the size of said unit 18 may be materially reduced.

As a result of this arrangement, the operator is enabled to handle in a more efficient manner the processing of the material and to exert a better control thereof during the processing operation, so that a better and more homogeneous final product is produced.

Since the fingers 47 of the two plates 44 and 46 terminate closely adjacent to the inner face of the central plate 45 and the inner face of the housing section 30, and since the fingers of the central plate 45 terminate closely adjacent to the inner face of the two plates 44 and 46 and the inner face of the housing section 31 between these two plates 44 and 46, these fingers, besides serving to stir, mix and blend the material, also serve to scrape the material from these inner faces, so that no substantial deposit of material is permitted to collect thereon. Also, since the fingers of the plates pass closely adjacent to the shafts 37, 38 and 39 in their rotary action, no substantial deposit of material is permitted to accumulate on these shafts. In this manner, the necessity for separate scraping means is obviated, and the likelihood of any shut-down of the blender due to the formation of deposits of the readily solidifiable material is unlikely.

Since the plates 44 and 46 have their inner faces in the same plane with the inner face of the housing section 31, and the inner face of the plate 45 is in the same plane with the inner face of the housing section 30, and since these faces of the housing sections follow closely the contour of their respective plates, no substantial pockets are presented which might accumulate material or create eddies in the flow. Furthermore, by means of this construction, a comparatively small amount of material under process passes into the sealed compartment housing the ends of the shafts, so that the main flow is directed through the working chamber.

When using the apparatus for treating of plastic materials such as margarine, butter, soap, or the like, those materials in themselves will lubricate the shafts, so that no external lubricant needs to be used and no contamination of the material being processed will occur. This sanitary construction of the blender adapts it readily to usages in connection with food materials and the like.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described the invention, what is claimed as new and desired to be secured by Letters Patent is:

1. In apparatus for mixing and agitating flowable material, means providing a working chamber having an inlet and an outlet for flow of material therethrough, at least two rotatable structures supported for rotation respectively about laterally spaced parallel axes with portions of said structures radially overlapping each other in spaced opposed relationship so as to provide for flow of material therebetween intermediate said inlet and said outlet, each of said structures having an annular row of agitating fingers concentrically mounted thereon and arranged so that the respective paths of rotation of the two rows intersect each other, said fingers extending parallel with said axes and the fingers of one row longitudinally overlapping the fingers of the other row so that all of the fingers project transversely across the path of flow of material between said structures, and means for effecting rotation of said structures in timed relationship so as to cause the fingers of each of said rows to interweave with and pass relatively close to the fingers of the other of the rows.

2. An apparatus for mixing and agitating flowable material including a working chamber having an inlet and an outlet, a plurality of circular plates mounted in said chamber adjacent to opposite walls thereof, and in opposed, staggered relationship in parallel planes on opposite sides of the path between said inlet and outlet, whereby the material flowing from the inlet to the outlet passes between said plates, means for rotating each plate about its axis, an annular series of fingers carried by each plate and projecting transversely of the path of flow of the material, and substantially to an opposed plate, a portion of the path of movement of the fingers of one plate being adjacent to said inlet, a portion of the path of movement of the fingers of another plate being adjacent to said outlet, and a portion of the path of movement of each row of fingers intersecting the path of movement of another row intermediate of the inlet and outlet.

3. An apparatus for mixing and agitating flowable material, including a working chamber having an inlet and outlet, at least two rotary plates mounted eccentrically in radially overlapping relationship in and on opposite sides of said chamber, an annular row of agitating fingers secured to each plate and overlapping transversely and longitudinally of said fingers, said fingers extending from the inner faces of the plates transversely of the general direction of flow of the material in the chamber, and means for rotating the sets of fingers in timed relationship to effect interweaving movement and self cleaning of the fingers of the sets as the rotary paths of movement of the sets intersect.

4. An apparatus for mixing and agitating flowable material, including a working chamber having an inlet and outlet, a pair of rotary plates mounted eccentrically in radially overlapping relationship in and on opposite sides of said chamber, two radially overlapping sets of circularly arranged agitating fingers secured to said plates respectively, and extending from the inner faces thereof transversely of the general direction of flow of the material therein, the fingers of each set terminating at their outer end closely adjacent to the inner face of the opposed plate to which the other set of fingers is secured, and means for rotating the two sets of fingers in timed relationship, to effect interweaving movement of the fingers of the two sets as the rotary paths of movement of the two sets intersect, and to effect dislodging of material from the fingers of one set by the fingers of another set.

5. An apparatus for mixing and agitating flowable material, including a working chamber having an inlet and outlet, a pair of laterally spaced parallel shafts extending across said chamber transverse to the general direction of flow therethrough, a pair of circular plates axially affixed to said shafts respectively in said chamber on opposite sides thereof and between said inlet and said outlet, the periphery of each plate being closely adjacent to the shaft supporting the other plate, two sets of circularly arranged agitating fingers secured to said plates respectively near the outer peripheries of said plates, and concentric with their respective shafts, and means for rotating said plates in time relationship to effect interweaving movement of the fingers of one set with that of the other to agitate the material flowing from the inlet to the outlet and to dislodge material adhering to the fingers of each set by the action of the fingers of the other set.

6. An apparatus for mixing and agitating flowable material, including a working chamber having an inlet and outlet, three sets of agitating fingers all disposed between said inlet and outlet and extending across said chamber transversely of the general direction of flow of the material therein, and arranged for cooperative agitating action between the fingers of one set and the fingers of the other two sets upon relative movement of said sets, and means for effecting movement of each of the finger sets in intersecting paths.

7. An apparatus for mixing and agitating flowable material, including a working chamber having an inlet and outlet, three rotary plates in said chamber, two of these being mounted in the same plane on one side of said chamber, the third plate being disposed in a parallel plane on the opposite side of said chamber substantially centrally of the other two plates and radially overlapping the latter plates, three sets of circularly arranged agitating fingers secured to said plates respectively, and each extending from the inner face of one plate transversely of the general direction of flow of the material therein substantially to the opposite plate, one of these sets radially and longitudinally overlapping the other two, and means for rotating said plates in time relationship to effect interweaving of the fingers of the overlapping set with those of the other two sets.

8. An apparatus for mixing and agitating plastic material, including a working chamber having an inlet and outlet, three laterally spaced parallel shafts extending across said chamber transverse to the general direction of flow therethrough, three plates in said chamber affixed to said shafts respectively, two of these plates being mounted in substantially the same plane on one side of said chamber, the third plate being disposed in a parallel plane on the opposite side of said chamber substantially centrally of the other two plates, and radially overlapping the latter plates, the periphery of said third plate being closely adjacent to the shafts of the other two plates, three sets of circularly arranged agitating fingers secured to said plates respectively near the outer peripheries thereof and concentric with their respective shafts, the outer ends of each set of agitating fingers extending closely adjacent to the inner face of the opposite plate, whereby said fingers serve to scrape the material from said faces during the movements of said fingers, and means for rotating said plates in time relationship to effect interweaving movement of the fingers of one set with that of the other to dislodge material adhering to said fingers.

9. An apparatus for mixing and agitating flowable material including a working chamber having an inlet and an outlet, a plurality of circular plates mounted in said chamber and in opposed, staggered relationship in parallel planes on opposite sides of the path of flow between said inlet and outlet, means for rotating each plate about its axis, the plates on opposite sides being rotated in opposite directions, an annular series of fingers carried by each plate and projecting transversely of the path of flow of the material, substantially to an opposed plate, a portion of the path of movement of the fingers of one plate being adjacent to and extending transversely of said inlet to effect gentle agitation of the incoming material, a portion of the path of movement of the fingers of another plate being adjacent to and extending transversely of said outlet to effect gentle agitation of the outgoing material, and a portion of the path of movement of each row of fingers intersecting the path of movement of another row intermediate of the inlet and outlet, whereby each finger of each row moves past and adjacent to a finger of another row to effect self-cleaning of the fingers and more violent agitation of the material in the intermediate portion of the chamber, and each finger acting to dislodge material adhering to opposed plate.

10. An apparatus for mixing and agitating flowable material including a working chamber having an inlet and an outlet, a plurality of finger supports in said chamber in opposed, staggered relationship on opposite sides of the path between said inlet and outlet, means for rotating each support, an annular row of fingers carried by each support projecting transversely of the path of flow of the material, a portion of the path of movement of one row of fingers being adjacent to said inlet to effect gentle agitation of the incoming material, a portion of the path of movement of another row of fingers being adjacent to said outlet to effect gentle agitation of the outgoing material, and a portion of the path of movement of each row of fingers intersecting the path of movement of another row intermediate of the inlet and outlet, whereby each finger of each row moves past and adjacent to a finger of another row to effect self-cleaning of the fingers and more violent agitation of the material in the intermediate portion of the chamber.

11. An apparatus for treating plastic material including a working chamber having an inlet and an outlet, means for continuously passing said material under pressure through said chamber, a plurality of rotatable finger supports in said chamber and in opposed, staggered relationship on opposite sides of the path of flow of the material, an annular series of fingers carried by each support and projecting transversely of the path of flow of the material, substantially to an opposite finger support, a portion of the path of movement of the fingers of one support being adjacent to and extending transversely of said inlet, a portion of the path of movement of another row of fingers being adjacent to and extending transversely of said outlet, and a portion of the path of movement of each set of fingers intersecting the path of movement of another row intermediate of the inlet and outlet, whereby the material adjacent to the inlet and to the outlet is gently agitated, and that in the intermediate portion of the chamber, is more violently agitated.

BRUCE DE HAVEN MILLER.